United States Patent [19]
Müller et al.

[11] Patent Number: 5,552,038
[45] Date of Patent: Sep. 3, 1996

[54] APPARATUS FOR DEWATERING ORGANIC SEWAGE SLUDGE, INDUSTRIAL SLUDGE AND SPECIAL WASTE SLUDGE OF VARYING COMPOSITION BY PRESSURE

[75] Inventors: Wolfgang Müller, Schieder-Schwalenberg; Dirk Herzog, Lemgo-Brake, both of Germany

[73] Assignee: Müller Umwelttechnik GMBH & Co. KG, Schieder-Schwalenberg, Germany

[21] Appl. No.: 319,135

[22] Filed: Oct. 6, 1994

[30] Foreign Application Priority Data

Jul. 29, 1994 [DE] Germany ............................ 9412246 U

[51] Int. Cl.⁶ .................................................. C02F 11/14
[52] U.S. Cl. ............................. 210/86; 210/90; 210/101; 210/104; 210/106; 210/112; 210/136; 210/143; 210/192; 210/203; 210/206; 210/258; 210/323.2; 210/332
[58] Field of Search .................... 210/86, 101, 104, 210/106, 111, 112, 136, 143, 203, 258, 323.2, 332, 90, 340, 192, 609, 709, 710, 738, 206

[56] References Cited

U.S. PATENT DOCUMENTS

| | | | |
|---|---|---|---|
| 1,771,928 | 7/1930 | Jung | 210/203 |
| 3,482,700 | 12/1969 | Bebech | 210/332 |
| 3,796,316 | 3/1974 | Matz | 210/332 |
| 5,377,423 | 1/1995 | Nagaoka | 210/609 |

FOREIGN PATENT DOCUMENTS

| | | | |
|---|---|---|---|
| 0272673 | 6/1988 | European Pat. Off. | 210/709 |
| 263722 | 4/1912 | Germany . | |
| 2603074 | 9/1977 | Germany | 210/770 |
| 3807275 | 9/1989 | Germany | 210/323.2 |
| 7404240 | 1/1975 | Netherlands | 210/323.2 |

*Primary Examiner*—Peter A. Hruskoci
*Attorney, Agent, or Firm*—Henry M. Feiereisen

[57] ABSTRACT

Apparatus for pressure drainage of organic sewage sludge, industrial sludge and special waste sludge of varying composition includes a fully automatic sludge conditioning unit for preparing a flocculating agent and a fully automatic sludge feeding unit for a pressure reactor which includes a press plunger reciprocating on filter candles between axial end plates. The press plunger cooperates with a riser pipe situated outside of each end plate and incorporating a motor-driven discharge valve. The riser pipe communicates with a screw conveyor which is mounted to the pressure reactor for further transport of filter cake to a container.

11 Claims, 3 Drawing Sheets

5,552,038

APPARATUS FOR DEWATERING ORGANIC SEWAGE SLUDGE, INDUSTRIAL SLUDGE AND SPECIAL WASTE SLUDGE OF VARYING COMPOSITION BY PRESSURE

BACKGROUND OF THE INVENTION

The present invention refers to an apparatus for dewatering organic sewage sludge, industrial sludge and special waste sludge of varying composition by pressure.

German Pat. No. 263,722 discloses an apparatus for dewatering peat or the like, which includes a receiving chamber equipped with filter candles for slidingly supporting a plunger. This apparatus has the drawback that the process runs only discontinuously.

SUMMARY OF THE INVENTION

It is an object of the present invention to provide an improved apparatus of the above-stated type, obviating the afore-stated drawbacks.

In particular, it is an object of the present invention to provide an improved apparatus of the above-stated type which runs continuously, is of compact design to require only slight need for space, produces small noise level and is subjected to minimal wear.

These objects and others which will become apparent hereinafter are attained in accordance with the present invention by providing a fully automatic sludge conditioning unit and a fully automatic sludge feeding unit for a pressure reactor which includes a press plunger reciprocating on filter candles between axial end retainer plates and cooperating with a riser pipe outside of each retainer plate and incorporating a motor-driven discharge valve for receiving dewatered filter cake transported by the press plunger, with the riser pipes communicating with a screw conveyor that is mounted to the pressure reactor for further transport of filter cake to a container.

In accordance with the present invention, the introduction of raw sludge into the pressure reactor and the discharge of the filter cake from the pressure reactor as well as the preliminary desiccation or afterdesiccation of the raw sludge in the compartments formed in the pressure reactor by the press plunger are effected by way of a continuous interaction. Through discharge on both sides of the pressure reactor via riser pipes, the filter cake is pressed by the press plunger via the motor-driven discharge valves into the screw conveyor which is situated above the pressure reactor. This screw conveyor then assumes the further transport and dumping of the filter cake on one side in a readied container while filtrate exits through the filter candles within the pressure reactor into a filtrate chamber and is continuously carried away via conduits and hoses.

The particular design of the filter candles and the continuous stripping of the outer metal surfaces by the reciprocating press plunger results in filter elements which are permanently free from clogging. The press plunger packing about the cylinder circumference and about the filter candles are subjected to minimal wear because of the continuous creation of a water film between the packing and the sliding surfaces. Also the addition of dissolved flocculating agent imparts the sludge with a good sliding behavior.

Suitably, the press plunger supports on both sides a telescopic pipe which has an outlet opening in proximity of the press plunger for exit of raw sludge into the compartments of the pressure reactor. The filtrate chamber is suitably located outside of one retainer plate adjoining the riser pipe and communicates with the filter candles.

The sludge conditioning unit includes a processing unit for preparing the flocculating agent, which has a first receptacle containing a polymeric parent solution, a polymer pump whose suction side is connected to the first receptacle, a mixer which receives and blends the components polymeric parent solution from the first receptacle and water from a water source for making a useable polymer solution, and a second receptacle connected to the mixer via a feed conduit for receiving the useable polymer solution. Suitably, the second receptacle includes a circulation pump for circulating the useable polymeric solution, and sensors for indicating a highest and lowest admissible level of useable polymer solution within the second receptacle.

According to another feature of the present invention, the sludge feeding unit includes a sludge pump with a pressure side and a suction side, and a metering pump operatively connected to a first flowmeter for controlling a supply of useable polymer solution in a passageway from the second receptacle to the pressure side and the suction side. Preferably a check valve is disposed in the passageway between the pressure side of the sludge pump and the flowmeter.

BRIEF DESCRIPTION OF THE DRAWINGS

The above and other objects, features and advantages of the present invention will now be described in more detail with reference to the accompanying drawing in which.

DETAILED DESCRIPTION OF A PREFERRED EMBODIMENT

Figure 1:
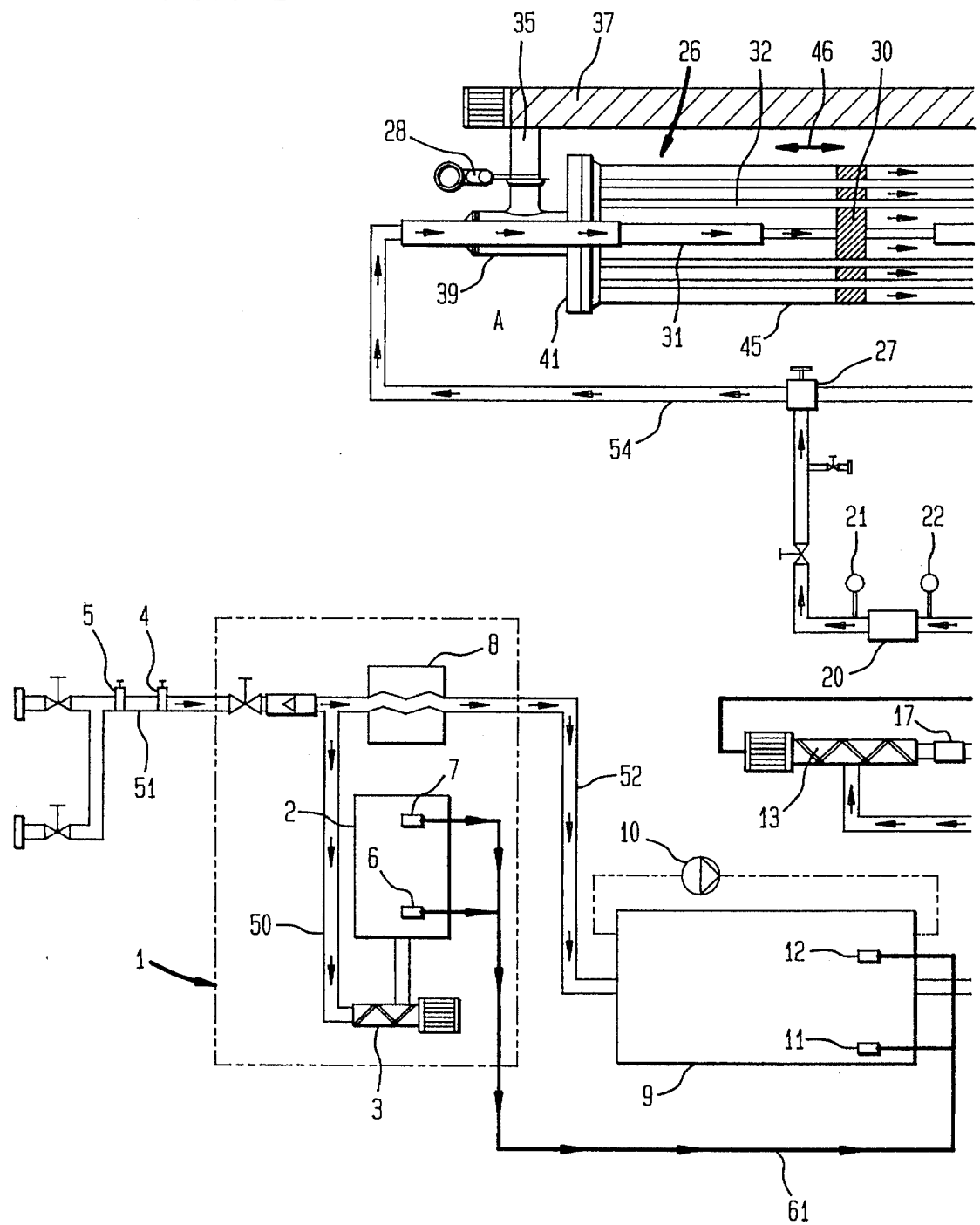
FIG. 1 is a schematic illustration of a left hand side of an apparatus for dewatering sludge by pressure, in accordance with the present invention.

Throughout all the Figures, the same or corresponding elements are always indicated by the same reference numerals.

Figure 2:
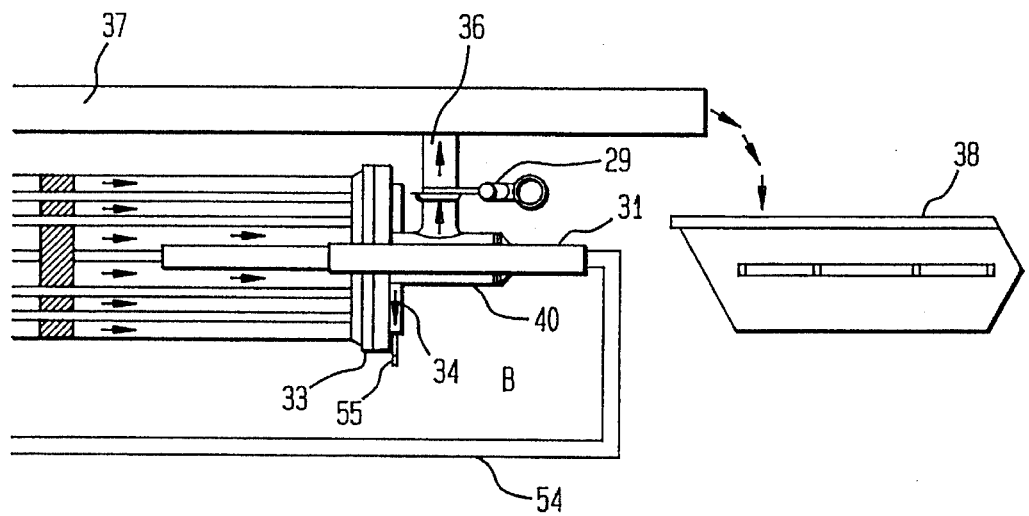
FIG. 2 is a schematic illustration of the right hand side of the apparatus according to the present invention.
Figure 2:
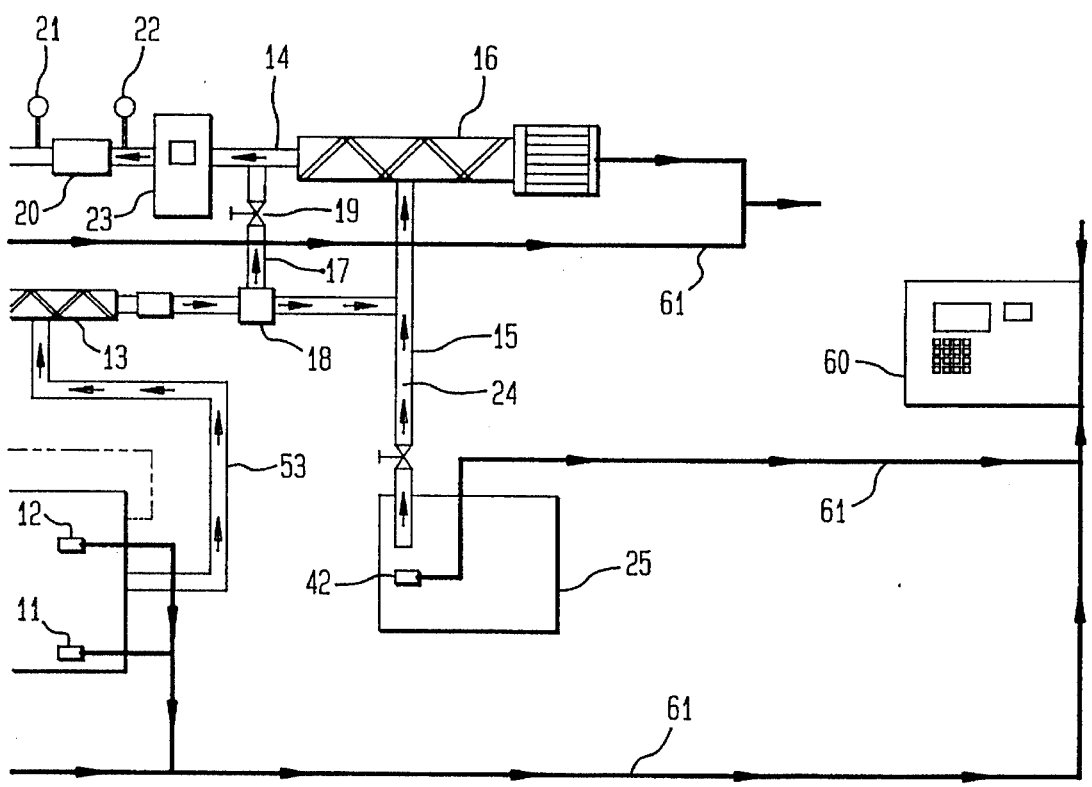
Figure 3:
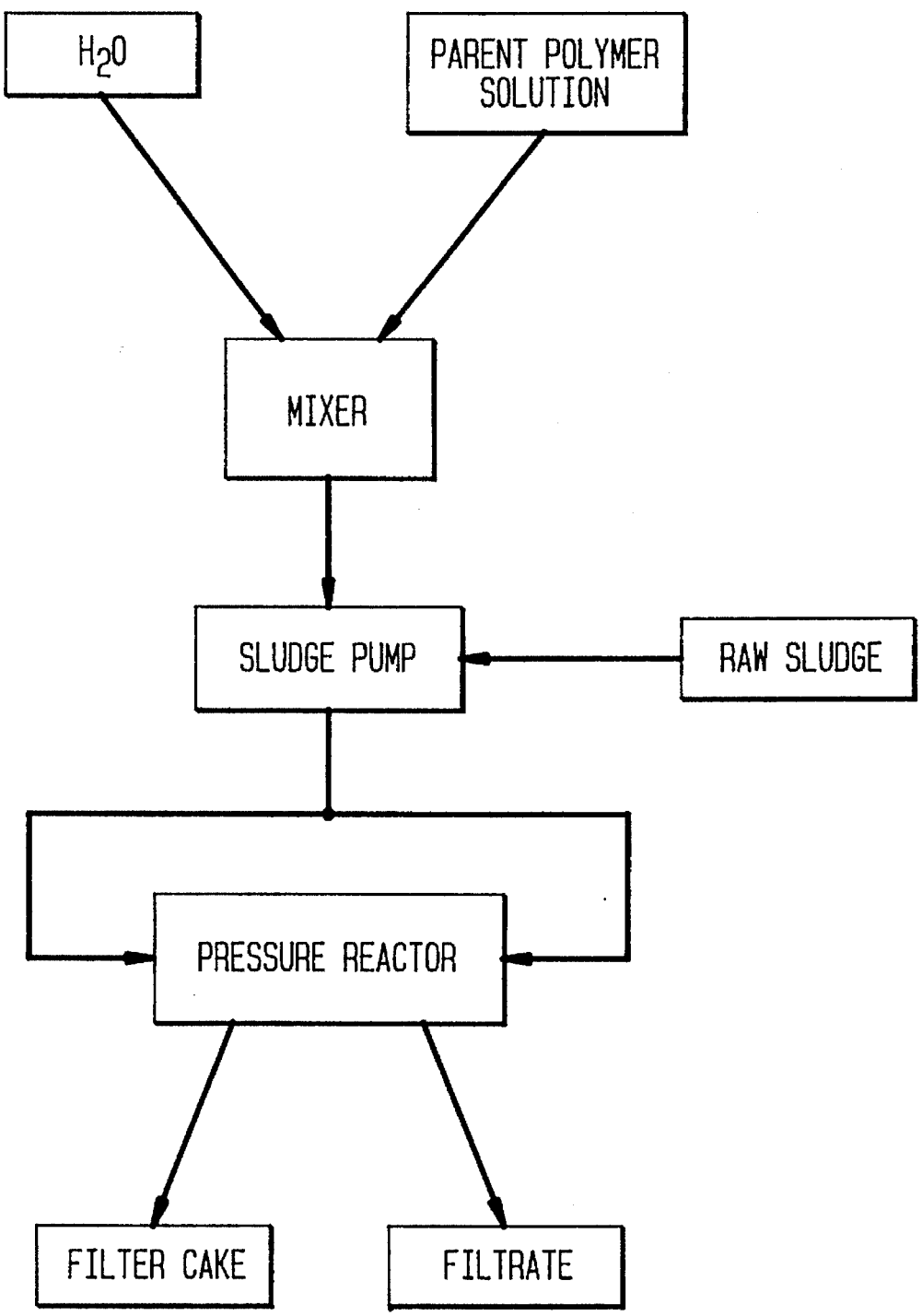
FIG. 3 a schematic block diagram of the apparatus according to the present invention, illustrating essential process steps of the continuous operation.

Referring now to the drawing, and in particular to FIGS. 1 and 2 which show the left and right hand side of an apparatus for dewatering sludge by pressure, there is shown a sludge conditioning unit including a processing plant, generally designated by reference numeral 1 for preparation of a flocculating agent or useable polymer solution for admixture to raw sludge. The processing plant 1 has a receptacle 2, containing a polymeric parent solution, and a pump 3, the suction side of which is connected to the bottom of the receptacle 2 for pumping polymeric parent solution via a conduit 50 to a mixer 8. At a same time, water is supplied from a water source through conduit 51 to the mixer 8 via a solenoid valve 4, with the required water supply being monitored by a pressure switch 5 in such a manner that the polymer pump 3 and the water valve 4 are open only when the set minimum water pressure is reached.

In order to protect the pump 3 from running dry, the receptacle 2 accommodates a level switch in form of two probes 6, 7 which form respective signals commensurate with a lowest and highest admissible level of polymeric parent solution in the receptacle 2. The signal formed by the probes 6, 7 are transmitted via control lines 61 to a control unit 60 (FIG. 2). When e.g. the probe 6 detects a level of parent solution within the receptacle 2 below a lower limit, a signal is sent from the level switch to the control unit 60 to shut down the water valve 4 and the polymer pump 3. Thus further preparation of useable polymer solution is stopped.

The polymer pump 3 is set at a fixed admixture ratio with regard to the water flow. After passage of the mixture of polymeric parent solution and water through the static mixer 8 to form the useable polymer solution, the latter is fed via conduit 52 to a receptacle 9. A circulation pump 10 effects a further intense blending of the both components, i.e. of polymeric parent solution and water. The preparation of useable polymer solution is effected automatically in an automatic program.

The receptacle 9 is also equipped with sensors 11, 12 which are operatively connected to the control unit 60 via control lines 61 to indicate the highest and lowest admissible level of useable polymer solution within the receptacle 9.

A conduit 53 connects the receptacle 9 to a metering pump 13 by which useable polymer solution is routed via a conduit 17 to a pressure conduit 14 or to a suction conduit 15 of a sludge pump 16. The conduit 17 is of T-shaped configuration, with a flowmeter 18 being situated at the T-junction. Disposed in the passageway of the conduit 17 between the flowmeter 18 and the entrance into the pressure conduit 14 of the sludge pump 16 is a check valve 19 to allow a flow of useable polymer solution only in one direction as indicated by the arrows.

The pressure conduit 14 of the sludge pump 16 is provided with a flowmeter 20 and with pressure gages 21, 22 which are situated upstream and downstream of the flowmeter 20, respectively. The pressure conduit 14 of the sludge pump 16 is further equipped with a dosing device 23 for optimizing the dosage of flocculating agent.

As shown in FIG. 2, the sludge pump 16 is further connected via the suction conduit 24 with a reservoir 25 which contains raw sludge. A sensor 42 monitors a suitable level of raw sludge within the reservoir 25 and is operatively connected via control lines 61 to the control unit 60. Raw sludge is drawn by the sludge pump 16 from the reservoir 25 and forced together with the useable polymer solution, i.e. conditioned sludge mixed with flocculating agent, through the pressure conduit 14 and via a reversing valve 27 and conduit 54 to a pressure reactor, generally designated by reference numeral 26. The reversing valve 27 enables an alternate supply of conditioned sludge to either side A or B of the pressure reactor 26.

The pressure reactor 26 includes a generally cylindrical housing 45 which is closed at its axial ends by end retainer plates 33 and 41. Extending horizontally in the cylinder 45 between the retainer plates 41, 33 across the cylinder 45 are a plurality of parallel filter candles or cartridges 32 which slidingly support a press plunger 30. The press plunger 30 reciprocates within the cylinder 45 in direction of double arrow 46 and divides the cylinder 45 in two compartments.

Conditioned sludge is supplied to the press plunger 30 in dependence on the setting of the valve 27 to either or both sides A and B of the pressure reactor 26 via telescopic pipes 31 which are respectively mounted to either side of the press plunger 30. In proximity of the press plunger 30, each telescopic pipe 31 is provided with an outlet opening (not shown) through which raw sludge enters the compartments of the cylinder 45.

As shown in FIG. 2, the filter candles 32 are extended beyond the retainer plate 33 of the pressure reactor 26 to enter a filtrate chamber 34 which is connected to a conduit 55 for enabling a continuous removal of filtrate.

Connected to the retainer plates 41, 33 of the pressure reactor 26 and respectively communicating with the compartments of the cylinder 45 are conduits 39, 40 which are closed at their axial ends. Each conduit 39, 40 supports and communicates with a riser pipe 35, 36 and concentrically surrounds a stationary part of the respective telescopic pipe 31 which leads to the press plunger 30. The riser pipes 35, 36 are connected to a screw conveyor 37 which extends atop the cylinder 45 and dumps filter cake into a container 38.

Filter cake is removed from the cylinder 45 of the pressure reactor 26 via two separate, motor-driven slide-type discharge valves 28, 29 which are respectively situated in the riser pipes 35, 35. By means of their opening width, the valves 28, 29 determine the discharge of the filter cake. A great opening of the slide valve can be interpreted within the automatic program in various manner. On the one hand, the filter cake may be highly desiccated which effects the flow capability of the filter cake. On the other hand, the solid content of the initial sludge may be great. Also, the opening of the slide valves 28, 29 is further determined by the filtering pressure as indicated by the pressure gages 21, 22. The press plunger 30 of the pressure reactor 26 essentially moves at a constant speed at constant charging amount.

The press plunger 30 which reciprocates from side A to B or vice versa, continuously pushes formed dewatered filter cake of the respective compartment via the automatically open discharge valve 28, 29 and the riser pipes 35, 36 to the screw conveyor 37 which transports the filter cake to the container 38.

The press plunger 30 which reciprocates within the cylinder 45 forms a hermetically sealed partition between varying volume of the compartments in which a preliminary desiccation and afterdesiccation of the inflowing raw sludge is alternately executed. When the sludge pump 16 fills one compartment with raw sludge via the telescopic pipe 31 which is mounted to the press plunger 30, the compartment volume increases at a same time by the pressure acted upon the press plunger 30. Filter cake forming between the filter candles 32 and subjected to a permanent pressure thus exerts pressure upon a large area of the press plunger 30 and moves the press plunger 30 accordingly. Since the press plunger 30 is securely fixed to the telescopic pipe 31 and the inflow of raw sludge is effected always in proximity of the press plunger 30 via the outlet opening in the inner pipe of the telescopic pipe 31 adjacent to the press plunger 30, fresh raw sludge comes always in contact with still clean filtering surface so as to effect an unimpeded separation of sludge water. The even distribution of the raw sludge upon the press plunger 30 results in a continuous formation of a new layer of filter cake so that the group of filter candles is evenly loaded with filtrate.

While the filtrate flows through the filter candles 31 into the filtrate chamber 34, the forming filter cake is permanently subjected to constant pressure at sufficiently long action time.

While the invention has been illustrated and described as embodied in an apparatus for dewatering organic sewage sludge, industrial sludge and special waste sludge of varying composition by pressure, it is not intended to be limited to the details shown since various modifications and structural changes may be made without departing in any way from the spirit of the present invention.

What is claimed as new and desired to be protected by Letters Patent is set forth in the appended claims:

1. Apparatus for dewatering organic sewage sludge, industrial sludge and special waste sludge of varying composition by pressure, said apparatus comprising:

a fully automatic sludge conditioning unit;

a fully automatic sludge feeding unit cooperating with said sludge conditioning unit for supplying conditioned sludge;

a pressure reactor receiving conditioned sludge from said feeding unit, and including a press plunger reciprocating on filter candles between axial end retainer plates for conveying formed dewatered filter cake;

a filtrate chamber formed outside of one retainer plate and communicating with said filter candles for removal of filtrate; and discharge means for removing the filter cake from said pressure reactor, said discharge means including a riser pipe located outside of each of said retainer plates and incorporating a motor-driven discharge valve, and a screw conveyor mounted above said pressure reactor and communicating with said riser pipes for further transport of the filter cake to a container.

2. The apparatus of claim 1 wherein said discharge means includes a conduit secured at each side to said retainer plates of said pressure reactor for receiving dewatered filter cake and being closed at its axial ends, said pressure reactor including a telescopic pipe mounted to each side of said press plunger and adapted for discharge of conditioned sludge in proximity of said press plunger, said conduits concentrically enclosing a stationary portion of said telescopic pipes and supporting said riser pipes.

3. The apparatus of claim 1 wherein said filtrate chamber is located outside of one retainer plate next to a respective one of said riser pipes and including an outlet, said filter candles traversing said one retainer plate for connection to said filtrate chamber.

4. The apparatus of claim 1 wherein said sludge conditioning unit includes a processing unit for preparing a flocculating agent, said processing unit having a first receptacle containing a polymeric parent solution, a polymer pump having a suction side connected to said first receptacle, a mixer receiving polymeric parent solution from said polymer pump and water from a water source for making a useable polymer solution, and a second receptacle connected to said mixer via a feed conduit for receiving the useable polymer solution.

5. The apparatus of claim 4 wherein said second receptacle includes a circulation pump for circulating the useable polymer solution, and sensor means for indicating a highest and lowest admissible level of useable polymer solution within said second receptacle.

6. The apparatus of claim 5 wherein said feeding unit includes a sludge pump with a pressure conduit and a suction conduit, and a metering pump operatively connected to a first flowmeter for controlling a supply of useable polymer solution in a passageway from said second receptacle to said pressure conduit and said suction conduit.

7. The apparatus of claim 6, further comprising a check valve disposed in said passageway between said pressure conduit of said sludge pump and said flowmeter.

8. The apparatus of claim 6, further comprising a second flowmeter in said pressure conduit of said sludge pump, and a pressure gage upstream and downstream of said flowmeter for measuring the pressure in said pressure conduit.

9. The apparatus of claim 6, further comprising a dosing unit located in said pressure conduit of said sludge pump upstream of said second flowmeter for optimizing a dosage of flocculating agent.

10. The apparatus of claim 6 wherein said press plunger forms two compartments, and further comprising a motor-driven, reversing valve situated in said pressure conduit of said sludge pump for alternately feeding said compartments with sludge conditioned with flocculating agent.

11. Apparatus for dewatering sludge of varying composition by pressure, comprising:

a mixer for preparing a flocculating agent;

a pressure filter unit having opposing axial ends and including a press plunger reciprocating on filter candles between said axial ends and conveying formed dewatered filter cake;

a filtrate chamber formed outside of one axial end and communicating with said filter candles for removal of filtrate;

a supply means for alternately feeding raw sludge conditioned with flocculating agent from said mixer to said filter unit via either axial end; and discharge means located at each axial end of said filter unit for removing filter cake from said filter unit and transport thereof to a container.

* * * * *